UNITED STATES PATENT OFFICE.

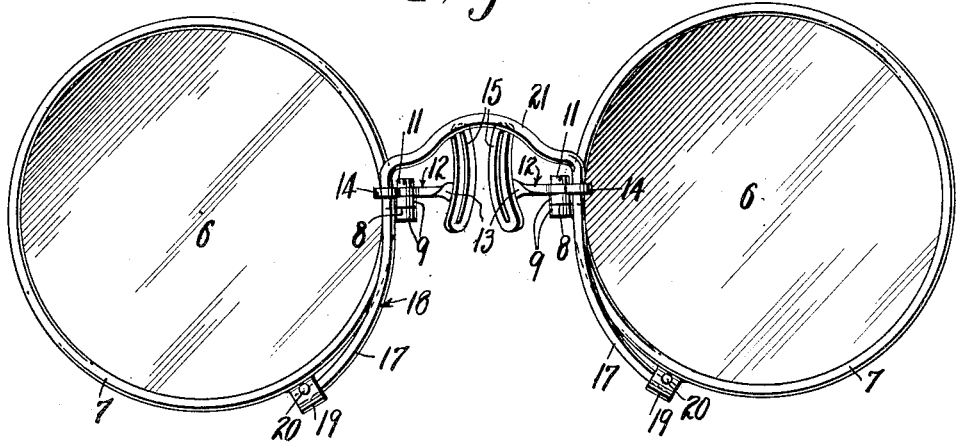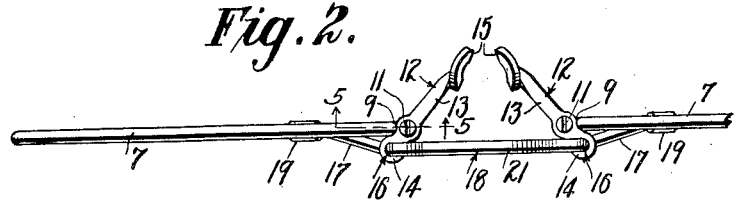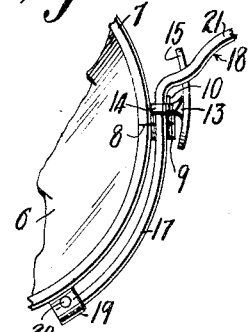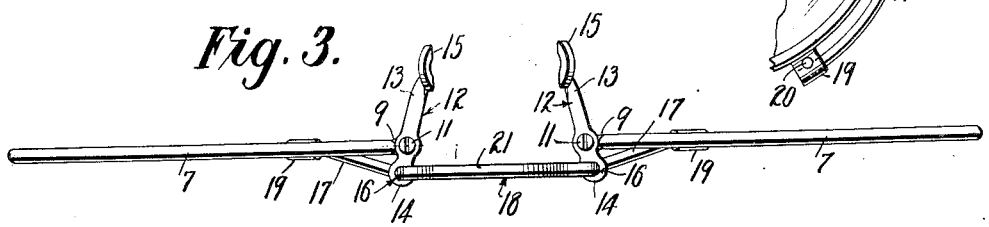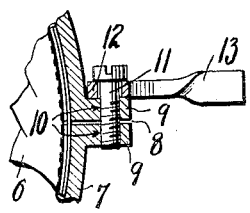

JULES FRITZ SANDOZ, OF PHILADELPHIA, PENNSYLVANIA.

EYEGLASSES.

1,322,138.　　　　Specification of Letters Patent.　　Patented Nov. 18, 1919.

Application filed August 6, 1919. Serial No. 315,582.

*To all whom it may concern:*

Be it known that I, JULES F. SANDOZ, a citizen of the United States, residing at Philadelphia, in the county of Philadelphia and State of Pennsylvania, have invented certain new and useful Improvements in Eyeglasses, of which the following is a specification.

One object of my invention is to provide eyeglasses of a simple and durable construction which will include resilient means operative to cause the eyeglasses to hold firmly to the nose of the wearer.

Another object is to so construct my improved eyeglasses that said resilient means also forms the nose bridge clamps.

A still further object is to so design my improved glasses that the parts thereof can be quickly and cheaply made and put together.

These objects, and other advantageous ends which will be described hereinafter, I attain in the following manner, reference being had to the accompanying drawings in which—

Figure 1 is a front elevation showing my improved eyeglasses.

Fig. 2 is a top plan view of Fig. 1,

Fig. 3 is a top plan view showing the nose gripping means having been separated to permit the glasses to be attached to the nose, Fig. 4 is a fragmentary elevation illustrating the effect upon the resilient means caused by the separation of the nose gripping members, for example as shown in Fig. 3, and Fig. 5 is a fragmentary section taken on the line 5—5 of Fig. 2 and drawn on an enlarged scale.

Referring to the drawings 6 represents the lenses which are positioned within rims 7. These rims are split transversely as shown at 8 in order to permit the ready insertion of the lenses 6. The ends of the rims adjacent the slits 8 are bent to provide lugs 9 and these lugs have tapped holes 10 which register with each other as clearly shown in Fig. 5. A headed screw 11 is inserted through the tapped holes 10 and serves to hold the ends of the rims together.

Levers 12 are pivotally mounted on the screws and the upper lugs 9. Each of the levers 12 has two oppositely disposed arms 13 and 14. The arms 13 extend rearwardly and have nose gripping members 15 thereon. The arms 14 extend forwardly of the frame as clearly shown in Figs. 2 and 3, and have holes 16 through which leg portions 17 of a yoke 18 freely extend. The lower ends of the leg portions 17 are secured within the bosses 19 by pins 20; said bosses being soldered or otherwise secured to the rims 7.

The upper portion of the yoke 19 above the arms 14 extends transversely between the rims 7 and is made arcuate so as to provide a nose bridge 21. The yoke 18 is preferably made of resilient wire and normally tends to move the arms 14 apart and consequently move the nose gripping members 15 toward each other, for example from the positions shown in Figs. 3 and 4 to the positions shown in Figs. 2 and 1. Therefore when the nose gripping members 15 are separated, such for example as when the eyeglasses are to be placed upon the nose, tension will be imparted to the leg portions of the yoke 18 said tension resulting in the slight separation of the rims and lenses against the resiliency of the yoke 18. When the nose gripping members are released the resiliency of the yoke 18 serves to move the nose gripping members toward each other to clamp the glasses to the nose.

It will be noted that the screws 11 serve in two capacities, first they hold the ends of the rims together to retain the lenses and in the second place they form a pivot and fulcrum for the levers 12, permitting the connection of the yoke member adjacent its top. It is obvious from the above description that the parts can be readily separated for removing the lenses, it merely being necessary to remove the screws 11 to permit the separation of the ends of the rims. This can be easily done since as clearly shown in Figs. 2 and 3, the screws 11 are positioned to the rear of the yoke so that a screw driver can be easily used.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. Eye glasses including a resilient yoke having an arcuate portion forming a nose bridge; lens-holding portions; pivoted levers on said lens-holding portions; and nose gripping members on said levers, said levers having portions connected to said yoke whereby when said nose gripping members are separated the yoke will be placed under tension and will tend to move said nose gripping members in clamping engagement with the nose, said yoke having parts adjacent its ends secured to said lens-holding portions, substantially as described.

2. Eye glasses including rims having lugs thereon; levers pivotally connected to said lugs; nose gripping members on said levers; and a resilient yoke having a portion providing a nose bridge and other portions respectively connected to said levers between the nose bridge and the ends of said yoke, said ends of the yoke being respectively connected to said rims; substantially as described.

3. Eye glasses including split rims having lugs adjacent the splits in the rims; screws connecting said lugs of each rim; levers pivotally mounted on said screws; nose gripping members on said levers; a resilient yoke having a nose bridge portion and other portions connected to said levers between the nose bridge and the ends of the yoke; and means for securing the ends of said yoke to said rims; substantially as described.

4. Eye glasses including split rims having lugs adjacent the splits in the rims; screws connecting said lugs of each rim; levers pivotally mounted on said screws; nose gripping members on said levers; a resilient yoke having a nose bridge portion and other portions connected to said levers between the nose bridge and the ends of the yoke; bosses on said rims; and means for securing the ends of said yoke within said bosses; substantially as described.

In testimony whereof I have signed my name to this specification in the presence of two subscribing witnesses.

JULES FRITZ SANDOZ.

Witnesses:
CHAS. E. POTTS,
ANNA RENTON.